United States Patent [19]

Koppenwallner

[11] 3,728,827
[45] Apr. 24, 1973

[54] SAFETY DEVICE FOR A GRINDING SPINDLE

[75] Inventor: Georg Koppenwallner, Weil der Stadt, Germany

[73] Assignee: Fortuna-Werke Maschinenfabrik AG, Stuttgart-Bad Cannstatt, Germany

[22] Filed: Sept. 1, 1971

[21] Appl. No.: 176,992

[30] Foreign Application Priority Data

Sept. 5, 1970 Germany..................P 20 44 046.4

[52] U.S. Cl. ........................................51/168, 51/268
[51] Int. Cl. ..............................................B24b 41/00
[58] Field of Search........................51/168, 268

[56] References Cited

UNITED STATES PATENTS

| 2,981,300 | 4/1961 | Peterson et al. | 51/168 X |
| 3,247,621 | 4/1966 | Aller | 51/168 X |

Primary Examiner—James L. Jones, Jr.
Attorney—Walter Becker

[57] ABSTRACT

The specification discloses a safety device for a grinding machine wheel in which the receiving head, or hub, on which the wheel is mounted is clamped to a spindle shaft by a threaded clamp element and has a guiding surface on the side facing away from the frame of the machine. The frame also has a guiding surface facing the guiding surface on the receiving head and cooperating therewith to support the receiving head radially while confining the receiving head axially in the event the threaded clamp element becomes loose on the shaft.

7 Claims, 1 Drawing Figure

Patented April 24, 1973 3,728,827
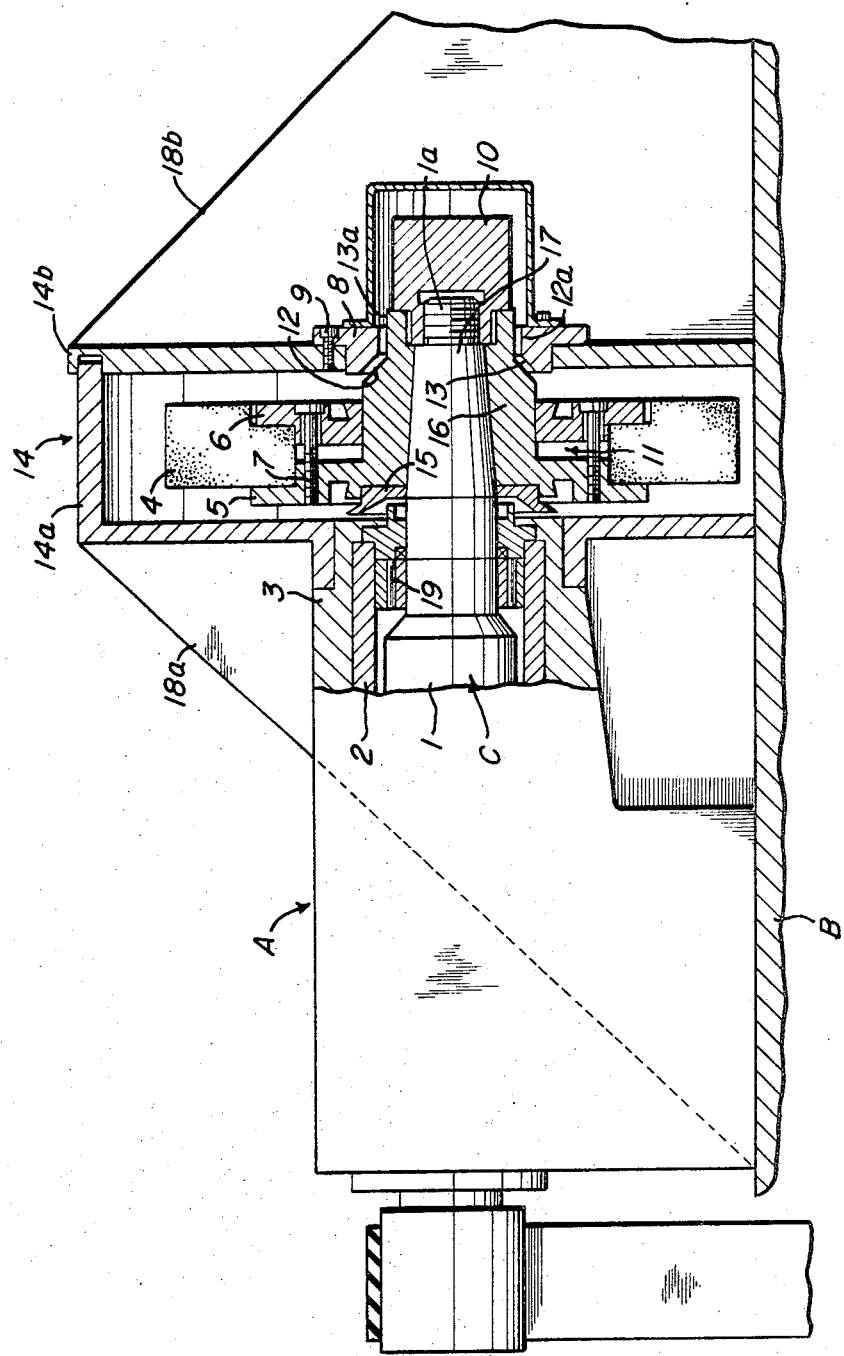

SAFETY DEVICE FOR A GRINDING SPINDLE

The present invention relates to a safety device for a grinding spindle which comprises a spindle shaft with a receiving head for the grinding tool, the head being arranged in overhung position. The head is by means of a threaded element arranged coaxially with regard to the spindle axis firmly connected to that end of the spindle shaft which is adjacent the tool, the connection being effected by means of a device adapted to be rotated in a direction counter to the working direction of rotation of the spindle shaft.

With spindles of this type, customarily the head for receiving the grinding tool comprises a sleeve body connected to the spindle shaft by means of a conical seat and equipped with a fixed and a loose flange between which a grinding disc or a grinding wheel is centered and clamped fast by axially movable threading means. The sleeve body of the receiving head is by a threaded element generally designed as pressing nut pressed against the cone of the spindle shaft and is thereby frictionally connected in the direction of rotation but is not positively connected to the spindle shaft.

It is a well known fact that with grinding spindles and, more specifically, with grinding spindles journalled in sliding bearings as well as spindles journalled in antifriction bearings, the possibility of seizing and jamming of the spindle bearings is practically not excluded. When the spindle at more or less high speed is stopped at a correspondingly strong angular retardation in view of seizing or jamming bearings, there exists the possibility that the friction between the receiving head and the spindle shaft will not be able to cope with the centrifugal moment of the rotating grinding disc so that the receiving head will carry out a relative movement with regard to the spindle shaft and, more specifically, in such a direction that the threaded element or the pressing nut will become loose. Such slipping of the receiving head with the grinding disc in case of jamming is even desired inasmuch as with a sudden braking of the grinding disc the danger exists that the disc will break resulting in the inherent dangers and unavoidable damages to the machine. These problems weigh particularly heavy in connection with high output and high speed grinding machines. The slipping receiving head exerts a torque upon the screw element in loosening direction against which torque the screw element can generally not be effectively secured. The great centrifugal mass of the grinding disc connected to the receiving head will in such an instance with the customary spindle designs lose its centering and may bring about considerable damage to the machine in which connection an increased danger exists that the grinding disc will break.

It is, therefore, an object of the present invention to provide a safety device in connection with grinding spindle systems of the above mentioned type, which will bring about that the braking moment acting upon the grinding disc and desired per se when the receiving head slips will be retained if a bearing is jammed without losing the centering of the receiving head and the grinding disc.

This object and other objects and advantages of the invention will appear more clearly from the following specification in connection with the accompanying drawing diagrammatically illustrating a vertical section through the spindle axis of a grinding wheel head with protective hood of a round grinding machine.

The safety device according to the present invention is characterized primarily in that within the region of the outermost end face of the receiving head there is provided a first guiding surface which is coaxial with the spindle axis and is non-rotatably connected to the receiving head, and there is furthermore provided a second guiding surface which is in fixed relationship with the frame and which, with the receiving head firmly tightened, is associated with the first guiding surface with play, the second guiding surface being adapted to support the first guiding surface at least in radial direction when the receiving head is detached from the spindle shaft.

Referring now to the drawing in detail, the grinding wheel head generally designated A is mounted on a machine bed B and in receiving means 3 carries a grinding spindle generally designated C. The grinding spindle customarily comprises a spindle sleeve 2 with a spindle shaft 1 which is journalled therein and the left-hand end of which is adapted in any convenient or customary manner to be coupled to a drive, whereas the right-hand end of the spindle shaft 1 on a cone 17 carries a receiving head 11 with a fixed flange 5 and a loose flange 6. A sleeve body 16 of the receiving head 11 is mounted on the cone 17 and by means of a screw element 10 designed as pressing nut is non-rotatably connected to the spindle shaft merely by static friction, which means frictionally, the screw element 10 being mounted on a threaded extension 1a of spindle shaft 1.

Between the two flanges 5 and 6 of the receiving head 11 and, more specifically, centered on a shoulder of the fixed flange 5 there is clamped in axial direction by clamping screws 7 a grinding disc 4 which is provided within a protective hood 14 fixedly connected to the machine. The protective hood 14 comprises substantially two parts 14a and 14b which in axial direction are arranged adjacent to each other. These parts 14a and 14b are connected to the machine bed by triangular supporting flanges 18a and 18b. Part 14b of the protective hood 14 with the supporting flange 18b may selectively for exchanging the grinding disc or the grinding head be detached from the machine bed and may be displaced on the latter toward the outside.

If the bearing of the spindle shaft 1 seizes or gets jammed, the receiving head 11 with grinding disc 4 will in general slip on the cone 17 of the grinding spindle while overcoming the static friction. In such an instance the tightened screw element 10 will be carried along in its loosening direction and consequently will unscrew itself from the threaded extension 1a of the spindle shaft.

It is for this disorder that the safety device according to the present invention is provided with a guiding surface 13 in fixed relationship to the machine and with a guiding surface 12 arranged on the receiving head 11. The two guiding surfaces form conical surfaces which are congruent to each other and which taper at the free end of the spindle shaft 1. These conical surfaces are in normal condition of operation with the receiving head 11 in tightened condition arranged with mutual play as shown in the drawing. These conical guiding surfaces are in the specific example shown followed by cylindrical guiding surfaces 12a and 13a. The fixed guiding surfaces 13 and 13a are provided on an annular centering member 8 which by means of screws 9 is connected to the protective hood part 14b. All of the above mentioned guiding surfaces are coaxial with regard to the spindle shaft 1. When a bearing should jam, and subsequent to a slipping through of the receiving head, the guiding surface 12 of the receiving head will in response to a displacement toward the spindle end engage the fixed guiding surface 13 so that the receiving head 11 will be supported in radial and axial direction and will remain sufficiently centered. In this way the danger will no longer exist that the grinding surfaces will impact upon the protective hood with a resulting damage to the machine and, above all, the increased danger that the disc will break will thus be eliminated. Simultaneously, the centrifugal mass of the grinding disc with receiving head will, in view of the relatively high friction between the conical guiding surfaces, be slowly braked which means in a careful manner.

When the receiving head moves off the cone 17 of the spindle shaft while the play between the guiding surfaces 12 and 13 is overcome, the inner end edge of the conical bore of the sleeve body 16 of the receiving head 11 is unilaterally located on the stationary cone 17 and may eventually damage the fitting surface of this cone. In order to prevent such a situation, that end face of the receiving head which faces toward the grinding wheel head has connected thereto an annular supporting member 15 which may be pressed, for instance, into a corresponding recess whereby the end edge of the conical bore of the receiving head will be covered. The supporting member 15 is made of a softer material than the conical seat surface of the spindle shaft, for instance of aluminum, so that the above referred to danger of damage will be excluded. In the particular example shown, the supporting member 15 is at the same time designed as slinger ring associated with the spindle shaft bearing 19, the slinger ring being adapted to prevent the entry of grinding coolant into the oil chamber of the spindle bearing.

As will be evident from the above, with a safety device according to the invention, the receiving head 11 with grinding disc will be able, in case of a jamming of a bearing, to detach itself without difficulties from the spindle shaft while the screw member is being turned loose. In this way the disc will be saved high braking forces while simultaneously a sufficient centering and support of the receiving head will be retained by the guiding surfaces which will now engage each other. Moreover, the centrifugal force will now, in view of the occurring friction between the guiding surfaces, be braked in a soft manner so that the centrifugal mass will be stopped without the danger of breakage or damage to the spindle or the machine.

It is, of course, to be understood that the present invention is, by no means, limited to the particular showing in the drawing but also comprises any modifications within the scope of the appended claims.

What is claimed is:

1. A safety device for a grinding machine having a frame and a spindle shaft therein and bearing means in the frame supporting the shaft with one end of the shaft projecting from the frame for receiving a grinding wheel, a receiving head seated on said projecting end of the shaft and having a grinding wheel mounted thereon, a threaded clamp element threadedly engaging the end of the shaft and clamping said receiving head thereon and having threads of a hand such that working loads on said grinding wheel while it is being driven by said shaft tend to tighten the threaded element on the shaft, first guiding surface means on said receiving head coaxial with said shaft and facing away from said frame, and second guiding surface means rigid with said frame and also coaxial with said shaft, said second surface facing said first surface and normally being spaced therefrom but cooperating therewith to provide radial support for said receiving head upon loosening of said threaded element on said shaft.

2. A safety device according to claim 1 in which said first and second surfaces include conical regions which taper inwardly at the same angle in a direction away from said receiving head and which are at least partly coextensive in the axial direction.

3. A safety device according to claim 2 in which said first and second surfaces also include coaxial cylindrical regions which are also at least partly coextensive in the axial direction.

4. A safety device according to claim 1 which includes a hood mounted on said frame and at least partially enclosing said grinding wheel, said hood including a wall portion facing that side of said grinding wheel which faces away from said frame, a centering member mounted in said wall portion so as to be intersected by the extension of the axis of said shaft, and said second surface being formed on said centering member.

5. A safety device according to claim 1 in which the projecting end of said shaft has a conical seat, said receiving head having a conical bore engaging said conical seat, and a protective element of a material softer than that of said shaft fixed to said receiving head on the side thereof facing said frame to engage said seat when said threaded element loosens to prevent said receiving head from damaging said seat.

6. A safety device according to claim 5 in which said protective element is in the form of a ring and has a central bore of about the same diameter as the larger end of the conical bore in said receiving head, said ring being positioned on said receiving head so the bore in said ring is coaxial with the conical bore in said receiving head and forms a continuation thereof at the larger end of said conical bore.

7. A safety device according to claim 6 in which said ring is formed with a radial portion disposed between said receiving head and said frame and serving as a slinger ring.

* * * * *